United States Patent [19]

Mainville

[11] Patent Number: 4,682,765
[45] Date of Patent: Jul. 28, 1987

[54] WELDING JIG APPARATUS

[76] Inventor: Jack Mainville, 25 Goffe St. North, Meriden, Conn. 06450

[21] Appl. No.: 811,106

[22] Filed: Dec. 19, 1985

[51] Int. Cl.[4] .............................................. B25B 1/20
[52] U.S. Cl. ...................................... 269/41; 269/32; 269/34; 269/42; 269/43; 269/50
[58] Field of Search ....................... 269/41, 42, 43, 50, 269/32, 34, 47, 52

[56] References Cited

U.S. PATENT DOCUMENTS

| | | | |
|---|---|---|---|
| 4,235,005 | 11/1980 | James | 269/41 |
| 4,598,453 | 7/1986 | Wills | 269/47 |

*Primary Examiner*—Frederick R. Schmidt
*Assistant Examiner*—Judy J. Hartman

*Attorney, Agent, or Firm*—McCormick, Paulding and Huber

[57] ABSTRACT

Welding jig apparatus for holding bar stock workpieces in an intersecting and aligned relationship to form a metal grating structure includes a number of elongated radial cams located in a spaced apart relationship to each other and in two parallel rows on a work surface. Workpieces are located between adjacent cam faces of cams opposite one another in the two rows when the cams are in a nonclamping position. The workpieces are clamped into the desired position by arcuate cam surfaces when the cams are rotated to clamping position. The work surface is tiltable to one of a number of work positions to facilitate the welding of intersecting workpieces into the grating structure.

3 Claims, 7 Drawing Figures

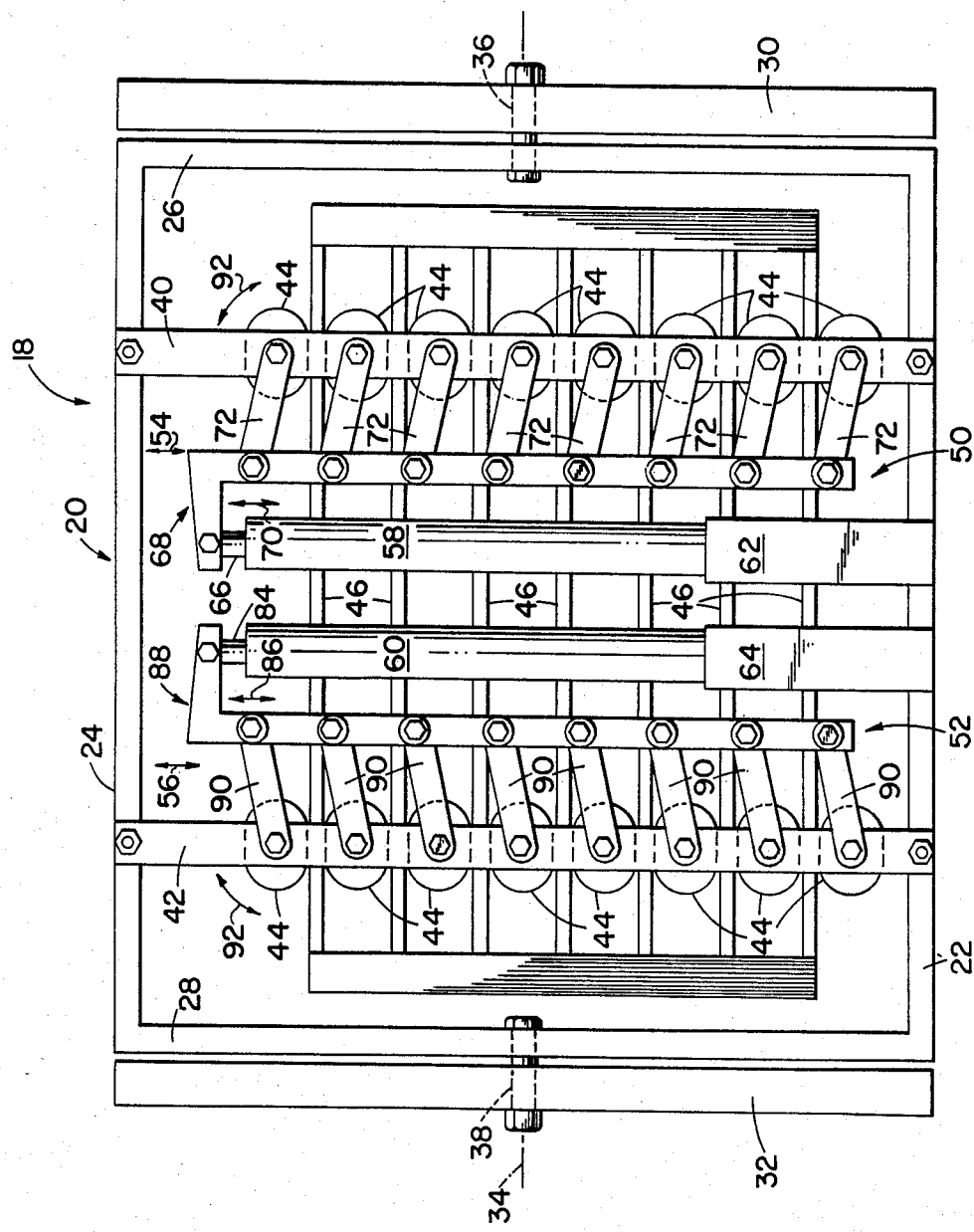
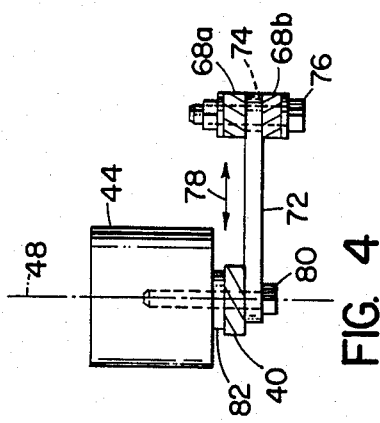

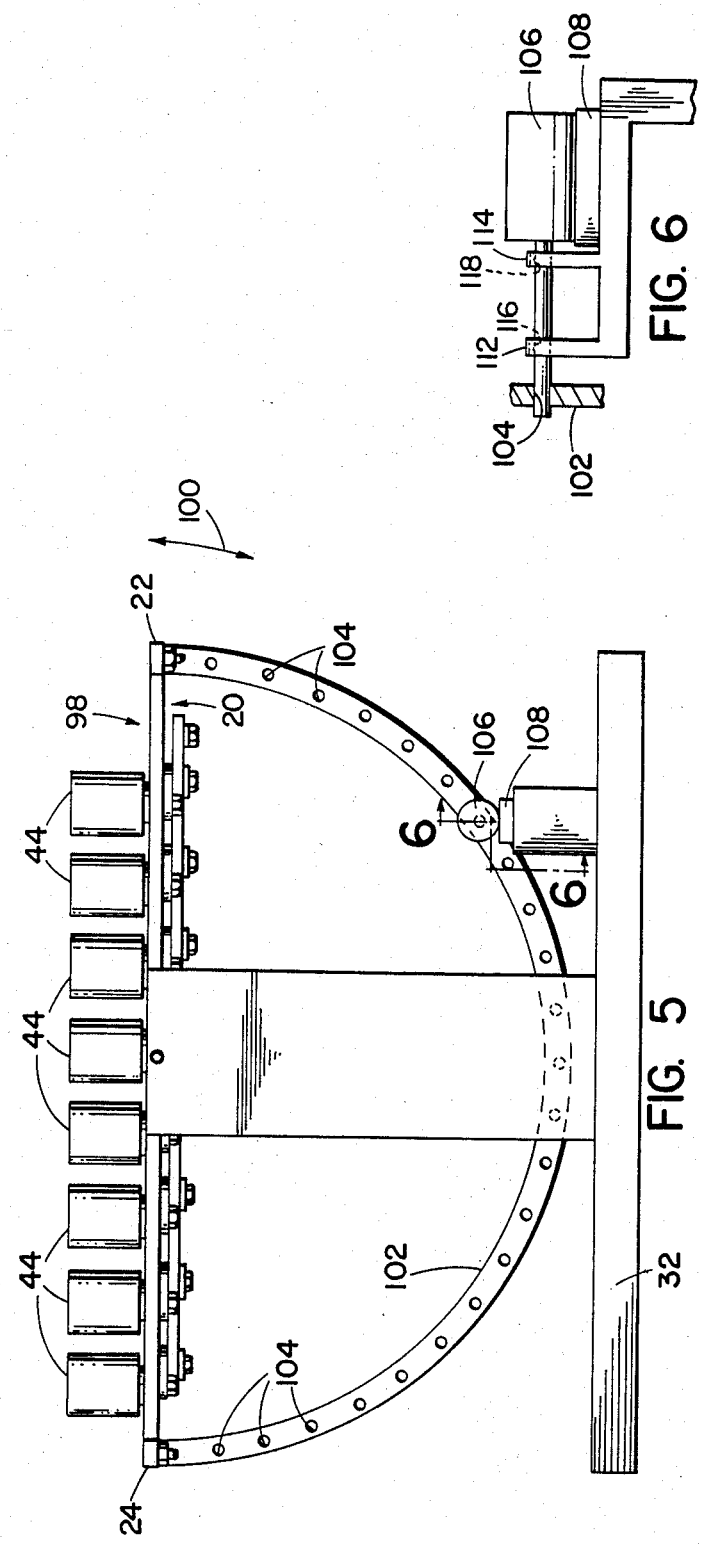

WELDING JIG APPARATUS

BACKGROUND OF THE INVENTION

The present invention relates generally to welding jig apparatus and deals more particularly with a welding jig apparatus for positioning and holding bar stock workpieces in an intersecting and aligned relationship for welding into a metal grating structure.

Metal grating structures of the type comprised of intersecting elements for use with storm water catch basins and the like are generally formed by clamping the elements to a steel topped table which is used as a temporary jig for assembling and welding the elements together into the desired grating. The obvious disadvantages of this procedure are the jig has to be reconstructed each time a new grating is welded and the welding often has to be done in an awkward position. In addition, it is difficult and cumbersome to maintain the elements running in one direction spaced apart and parallel to one another and perpendicular to intersecting elements which also are held spaced apart and parallel to each other.

U.S. Pat. No. 3,815,890 to Urban issued June 11, 1974 discloses a welding jig for positioning and clamping elements of a grating structure wherein the jig and clamped grating elements are rotatable in the vertical plane to improve welding access to the intersecting elements forming the grating structure. One drawback to the welding jig disclosed by Urban is that the support frame must be in the vertical plane with the lateral frame members generally parallel to the ground surface so that support pins located on pin supporting bars transversely mounted between the lateral frame members provide a surface upon which the elements are rested prior to clamping. The grating side members are then manually clamped to the spaced apart grating elements in readiness for welding. Although the Urban welding jig facilitates the assembly and welding of a grating structure in comparison to prior methods and techniques, the jig is not completely satisfactory. Twisting screw clamps are manually operated and are used to hold the grating elements in position and to the welding jig. The placement of the grating elements in the desired position on the supporting pins and the manual clamping required by the Urban welding jig is time consuming and in the case of repetitive manufacture of grating structures, the time consumed in the placement and clamping of the grating elements can become excessive over the course of a working day. In addition, the grating elements are susceptible to being knocked off the support pins during the placement of other elements on the jig.

A general object of this invention therefore, is to provide a welding jig apparatus for positioning and holding bar stock workpieces in an intersecting and aligned relationship for manufacturing metal grating structures.

Another object of the invention is to provide a welding apparatus which automatically and accurately clamps bar stock workpieces into the desired aligned relationship and parallel to one another substantially eliminating the possibility of misalignment.

A further object of this invention is to provide a tiltable welding jig apparatus for positioning the bar stock workpieces in one of a number of positions for welding.

SUMMARY OF THE INVENTION

In accordance with the present invention, a welding jig is presented for holding and positioning a number of bar stock workpieces in an intersecting and aligned relationship to form a metal grating structure. A workpiece holding means comprising two longitudinal side members spaced apart from each other and two end members spaced apart from one another and transversely mounted between the ends of the side members form a rectangular-shaped work surface. The workpiece holding means is supported by a base and is arranged for limited pivotal movement about an axis extending generally between the centers of the end members.

Clamping means are coupled to the workpiece holding surface and comprise a plurality of radial cams extending generally perpendicularly from the work surface and in a common direction. The cams are rotatably coupled to an actuating mechanism and are arranged in a face-to-face uniformly separated configuration to form two spaced apart columns, each column being transversely located between the side members. The bar stock workpieces are placed between the faces of two adjacent cams when the clamping means is in its nonlocking position. The workpieces are clamped into the desired aligned position and grating pattern when the cams are rotated into clamping engagement with the opposite surfaces of a workpiece located between two adjacent cams and the clamped workpieces are held for welding.

BRIEF DESCRIPTION OF THE DRAWINGS

Other objects and advantages of the invention will be apparent from the following description and claims taken in conjunction with the accompanying drawings wherein:

FIG. 1b is a fragmentary perspective view of bar stock workpieces comprising the intersecting elements of the grating structure of FIG. 1a.

FIG. 2 is a schematic, bottom plan view of the welding jig of the present invention, the surface tilting and position holding mechanism removed, in its deactivated condition illustrating the linkage assembly and associated solenoid actuating mechanisms for rotating the clamping cams into and out of clamping engagement with the workpiece surfaces to hold and release the workpieces.

FIG. 4 is a schematic side view showing a clamping cam mounted on the welding jig work surface and connected to the linkage assembly.

FIG. 5 is a schematic side view of the welding jig of the present invention illustrating the work surface tilting and position holding mechanism.

FIG. 6 is a schematic, front view of the work surface position holding mechanism illustrated in FIG. 5.

DETAILED DESCRIPTION OF A PREFERRED EMBODIMENT

Figure 1B:
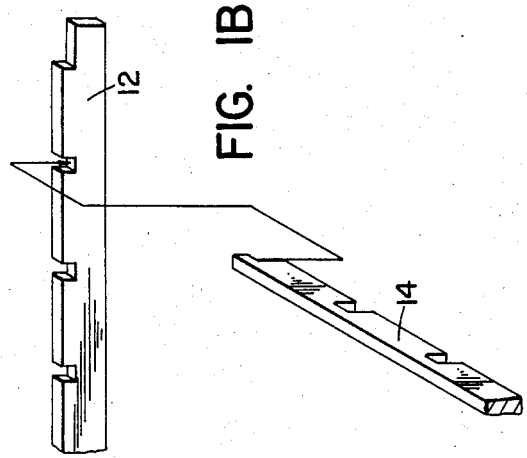
Figure 1A:
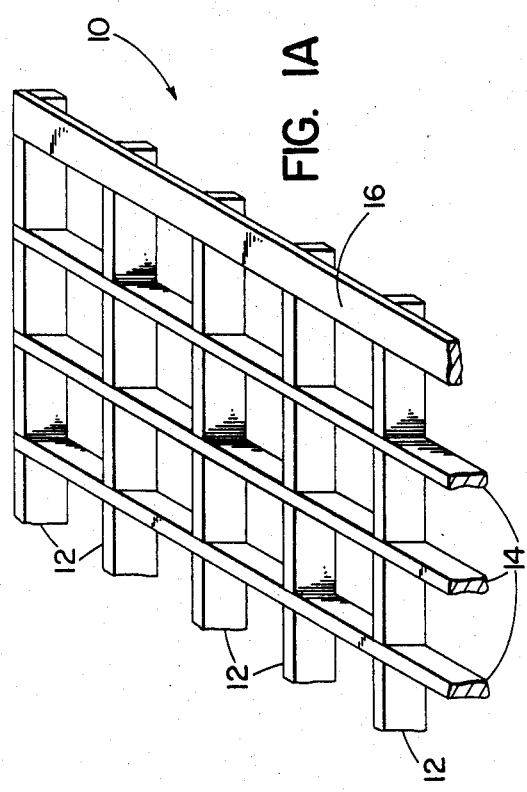
FIG. 1a is a fragmentary perspective view of a metal grating structure welded together from bar stock workpieces held in intersecting and aligned relationship by the welding jig apparatus of the present invention.

Turning now to the drawings and considering FIG. 1a in particular, a metal grating structure of the type which may be manufactured using the welding jig apparatus of the present invention is indicated generally by 10. The grating structure 10 includes a plurality of spaced apart, parallel, bar shaped elements 12 connected to a plurality of other spaced apart, parallel, bar shaped members 14 wherein the elements 12 and members 14 intersect one another at right angles. The embodiment of the grating structure 10 illustrated in FIG. 1a includes an end member 16 welded to the upper surface at the ends of bar shaped elements 12. A representative bar shaped element 12 and a bar shaped member 14 are shown in FIG. 1b for illustrative purposes to show one way in which the two bar shaped workpiece ends are connected together. It will be understood that other forms of intersecting workpieces and connection configurations can be used with the welding jig apparatus of the present invention.

Considering now FIGS. 2-5, a schematic, bottom plan view of the welding jig apparatus embodying the present invention is shown in FIG. 2 and is designated 18. A welding jig frame generally designated 20 includes two longitudinal side members 22, 24 arranged in a spaced apart, parallel relationship with one another. Two end members 26, 28 are mounted transversely between the side members 22,24 and are also arranged in a parallel, spaced apart relationship with each other to form a rectangular-shaped work surface. The welding jig frame 20 is supported by a base having sides 30, 32 and is arranged for pivotal movement about an axis 34 extending transversely between the end members 26, 28 and generally along a line midway between and generally parallel to the side members 22, 24 and through supporting bolts 36, 38. The bolt extends through the base side 30 and end member 26 and the bolt 38 extends through the base side 32 and end member 28 respectively to support the frame 20 for pivotal movement about the axis 34. The frame 20 also includes two inner members 40, 42 mounted transversely between side members 22, 24 and in a spaced apart, parallel relationship with one another and with end members 26, 28. Each of the inner members 40, 42 provides support for a number of radial cams 44,44 and the cams are located along the members 40,42 in a spaced apart, predetermined spatial relationship. The cams 44, 44 supported on member 40 are located directly opposite cams 44, 44 supported on member 42 so that a bar shaped workpiece 46 positioned between two adjacent cams 44,44 on inner member 40 and oppositely disposed cams 44,44 on inner member 42 is parallel to the side members 22, 24 and other workpieces 46, 46 located between other adjacent cams 44, 44.

Referring now to FIGS. 2 and 4, each cam is arranged for rotational movement about an axis 48 extending lengthwise through the center of the cam intersecting with the arcuate surfaces. The cam 44 includes two oppositely disposed arcuate shaped surfaces 43,45 and oppositely disposed faces 47,49.

The cams 44, 44 mounted on inner member 40 are coupled to a linkage mechanism 50 and the cams 44,44 located on inner member 42 are coupled to a linkage mechanism 52. The cams 44, 44 along inner member 40 are rotated when a drive bar 68 of the linkage mechanism 50 moves in the direction of arrow 54 and likewise, the cams 44, 44 located on inner member 42 rotate when a drive bar 88 the linkage mechanism 52 moves in the direction of arrow 56. The linkage mechanisms 50, 52 operate similarly and are actuated by an associated motor 58, 60 respectively.

One end of each motor 58, 60 is fixedly attached to an associated bracket 62, 64 respectively and each bracket is fixedly connected to the side member 22 and provides support for its associated motor. The free end of motor 58 includes a ram 66 coupled to one end of the drive bar 68 of the linkage mechanism 50 and when the motor is activated the ram moves in the direction of arrow 70 to move the drive bar 68 in the direction of 54.

The drive bar 68 comprises two parts which are best viewed in FIG. 4 and include an upper bar 68a and a lower bar 68b. The bars 68a and 68b sandwich one end of crank bars 72, 72 and have holes in registry through which a bolt 76 passes to hold the crank bar 72 between the upper and lower bars. The sandwiched end of the crank bar 72 includes a slot 74 to permit the bar 72 to move in the direction of arrow 78 as the drive bar 68 moves back and forth in the direction of arrow 54. The opposite end of the crank bar 72 is fixedly connected to a cam 44 by a bolt 80 threaded into the cam 44. The bolt 80 passes through the inner member 40 and a spacer 82 between the bottom of the cam and the upper surface of the member 40.

The motor 60 is coupled to the linkage mechanism 52 in the same manner as motor 58 is coupled to the linkage mechanism 50 as described above. Briefly, the motor 60 includes a ram 84 arranged for reciprocal movement in the direction of arrow 86 and the ram is coupled to the drive bar 88. The drive bar 88 also comprises an upper and lower portion to sandwich crank bars 90, 90 and the crank bars are coupled to the drive bar 88 and the cams 44, 44 in the same manner as the crank bars 72, 72 described above.

The motors 58, 60 preferably are electrically operated solenoids, however, hydraulic motors or other suitable motors and driving mechanisms well known to those skilled in the art may be used.

Figure 3:
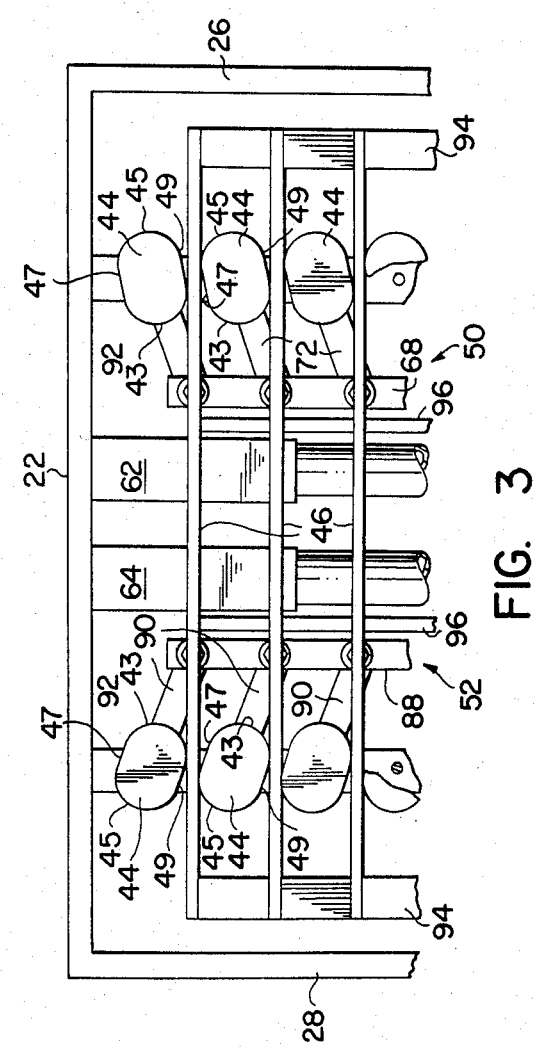
FIG. 3 is a fragmentary schematic, top plan view of the welding jig of FIG. 2 illustrating the cams rotated into clamping engagement with the surfaces of workpieces positioned between two adjacent cams.

Considering now FIGS. 2 and 3, FIG. 2 shows the linkage mechanisms 50, 52 in a nonlocking position and the cams 44, 44 in an associated nonclamping position to permit the placement of workpieces 46, 46 between the flat face surfaces of adjacent cams. In FIG. 3, the linkage mechanisms 50, 52 are shown moved to a locking position and cams 44, 44 are shown rotated in the direction of arrow 92 to an associated clamping position so that the arcuate surfaces of two adjacent cams located along a member 40,42 move into clamping engagement with the opposite faces of a workpiece 46 positioned between the cams. As the cams 44, 44 rotate, the workpieces 46, 46 are urged in a direction perpendicular to the work surface and positioned in a spaced apart, parallel and aligned relationship with one another.

In the actual assembly of one type of grating structure, end pieces 94, 94 are located and positioned on the work surface parallel to the end members 26, 28 respectively and inner grating pieces 96, 96 are located at desired spatial intervals between the end pieces 94, 94. The intersecting workpieces 46, 46 are then positioned between cams 44, 44 in intersecting relationship with end pieces 94, 94 and grating pieces 96, 96. The grating pieces 96,96 comprising the grating structure are similar to the one shown and identified 14 in FIG. 1b. The motors 58, 60 are then activated after the grating pieces have been placed on the welding jig to operate the linkage mechanisms 50, 52 to rotate the cams 44, 44 into clamping engagement with the grating pieces to hold the pieces of the assembled grating structure in an intersecting and aligned relationship for welding.

Turning now to FIG. 5, the welding jig work surface 98 from which the cams 44, 44 extend is tiltable in the direction of arrow 100 and permits the grating structure to be moved into one of a number of different positions to facilitate the welding of the intersecting grating structure workpieces. A semicircular member 102 has one end fixedly attached to the side member 22 of the frame 20 and its opposite end attached to side member 24 and is arranged to extend perpendicularly from the frame 20 in the direction of the foot of the base 32. The semicircular member 102 has a number of idents or stops 104, that are used for positioning and holding the work surface 98 at a desired position.

In the illustrated embodiment, FIG. 6 shows a solenoid motor 106 mounted on a shelf member 108 extending from the foot of the base 32. The solenoid extends lengthwise perpendicularly to the indent surface of the circular member 102 and includes a plunger ram 108 which moves in the direction of arrow 110 when the solenoid 106 is energized and de-energized. In its energized state, the plunger ram 108 of the solenoid 106 is retracted away from the circular member 102 to permit the welding jig surface to be tilted to a desired position. When the solenoid 106 is de-energized the plunger ram 108 moves in the direction of arrow 110 into engagement with an indent 104 to hold the welding jig surface in the selected position.

The shelf 108 includes two upwardly extending members 112, 114 each having openings 116, 118 respectively in registry with each other and the plunger ram 108 passing through them. The function of the members 112, 114 is to prevent the weight of the welding jig from exerting excessive torque on the ram and bending it when the ram is engaged with one of the indents 104.

A welding jig apparatus for positioning and holding bar stock workpieces in an intersecting and aligned relationship for welding into a metal grating structure has been described in a preferred embodiment. Numerous changes and modifications may be made by those skilled in the art without departing from the spirit and scope of the invention and consequently, the invention has been described by way of illustration rather than limitation.

I claim:

1. Welding jig apparatus for holding a plurality of bar stock workpieces in an intersecting and aligned relationship to form a metal grating structure, each of the bar stock workpieces extending lengthwise for a substantially greater distance than its height and having a predetermined thickness and further having a first planar face at one side of the workpiece and defined by the length and height and a second planar face disposed opposite the first face at the other side of the bar, said apparatus comprising:

a base;

a work surface supported by said base and including two longitudinal side members and two end members, each of said end members being positioned transversely between said side members in a spaced relationship and connected togehter to define a rectangular shaped work surface, said work surface further being arranged for limited pivotal movement about an axis extending transversely between said end members and generally along a line midway between and parallel to said side members;

clamping means comprising a plurality of radial clamping cams, each of said cams being elongated along its length and extending generally perpendicularly from said work surface and in a common direction, each of said cams further having four cam surface along its length wherein first and second surfaces are arcuate shaped and oppositely disposed from one another and third and fourth cam surfaces are flat faced and oppositely disposed from one another and each cam having an axis of elongation, said cams further being located transversely between said two side members and forming two rows of cams, said rows being spaced apart and generally parallel to said end members and to each other and each cam in one row having a cam opposite itself in the other row with the axes of elongation of the oppositely disposed cams defining an associated common line and each of said axes of elongation being parallel to one another, each of said cams further being arranged for rotation about an axis extending lengthwise through the center of the cam;

linkage means comprising a driving bar and connecting bars, one end of said connecting bar being pivotally coupled to said driving bar and the other end of said connecting bar being fixedly connected to said cam, each of said connecting bars associated with a row of cams being substantially simultaneously with one another each of said cams in a said row between a nonclamping and a clamping position when said driving bar is operated between a first and second position, said cams being rotated to said nonclamping position for locating a workpiece between two adjacent cams in a row, said cam flat faces parallel to one another for accepting a workpiece placed between them, said cams being rotated to said clamping position for holding the workpieces in a spaced apart, parallel relationship with one another, said cam arcuate shaped surfaces of two adjacent cams engaging with the workpieces surface to clamp the workpiece in the desired position;

motor means coupled to the linkage means for operating said driving bar between said first and second positions, and rotating means for tilting said work surface about the pivot axis to one of a number of intermediate work positions to facilitate the welding of intersecting pieces of bar stock into said grating structure.

2. Welding jig apparatus for holding a plurality of bar stock workpieces in an intersecting and aligned relationship to form a metal grating structure, each of the bar storck workpieces extending lengthwise for a substantially greater distance than its height and having a predetermined thickness and further having a first planar face at one side of the workpiece and defined by the length and height and a second planar face disposed opposite the first face at the other side of the bar, said apparatus comprising:

a base;

a work surface supported by said base and including two longitudinal side members and two end members, each of said end members being positioned transversely between said side members in a spaced relationship and connected together to define a rectangular shaped work surface, said work surface further being arranged for limited pivotal movement about an axis extending transversely between said end members and generally along a line midway between and parallel to said side members;

clamping means comprising a plurality of radial clamping cams, each of said cams being elongated along its length and extending generally perpendicularly from said work surface and in a common direction, each of said cams further having four cam surfaces along its length wherein first and second surfaces are arcuate shaped and oppositely disposed from one another and third and fourth cam surfaces are flat faced and oppositely disposed from one another and each cam having an axis of elongation, said cams further being located transversely between said two side members and forming two rows of cams, said rows being spaced apart and generally parallel to said end members and to each other and each cam in one row having a cam opposite itself in the other row with the axes of elongation of the oppositely disposed cams defining an associated common line and each of said axes of elongation being parallel to one another, each of said cams further being arranged for rotation about an axis extending lengthwise through the center of the cam;

linkage means comprising a driving bar and connecting bars, one end of said connecting bar being pivotally coupled to said driving bar and the other end of said connecting bar being fixedly connected to said cam, each of said connecting bars associated with a row of cams being substantially simultaneously with one another each of said cams in a said row between a nonclamping and a clamping position when said driving bar is operated between a first and second position, said cams being rotated to said nonclamping position for locating a workpiece between two adjacent cams in a row, said cam flat faces parallel to one another for accepting a workpiece placed between them, said cams being rotated to said clamping position for holding the workpieces in a spaced apart, parallel relationship with one another, said cam arcuate shaped surfaces of two adjacent cams engaging with the workpieces surface to clamp the workpiece in the desired position;

and motor means coupled to the linkage means for operating said driving bar between said first and second positions.

3. Welding jig apparatus as set forth in claim 2 wherein said work surface is arranged for limited pivotal movement about an axis extending transversely between said end members and generally along a line midway between and parallel to said side members, and rotating means for tilting said work surface about the pivot axis to one of intermediate a number of work positions to facilitate the welding of intersecting pieces of bar stock into said grating structure.

* * * * *